C. H. MYERS.
THERMOMETER DIAL.
APPLICATION FILED JULY 8, 1909.
955,091.
Patented Apr. 12, 1910.
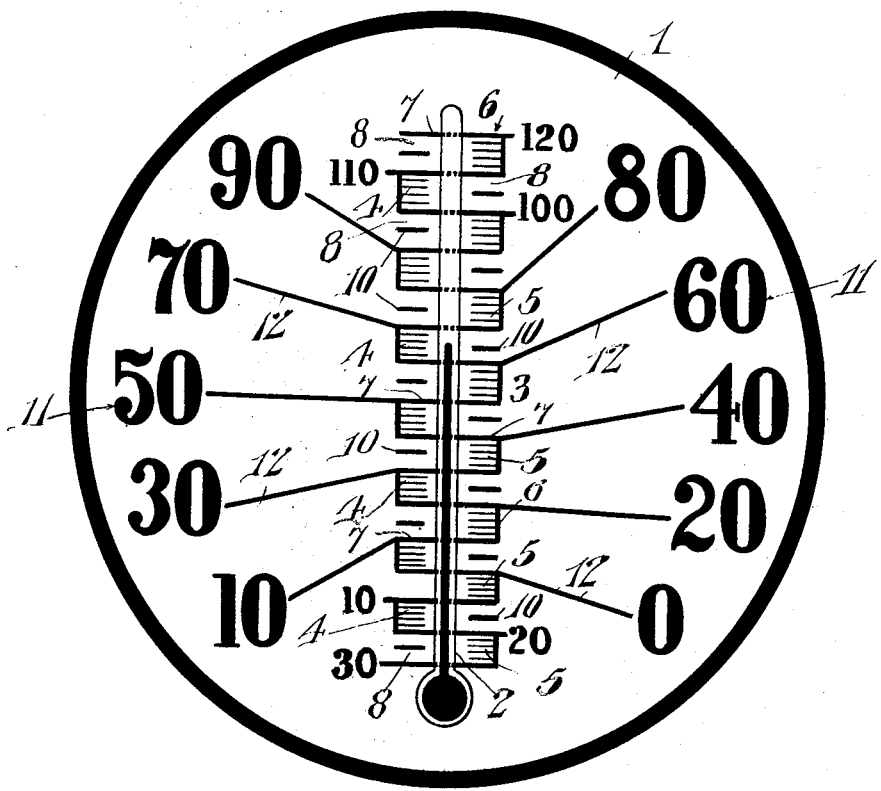
Witnesses
Jas. F. M<sup>c</sup>Cathran
C. Bradway.
Charles H. Myers, Inventor
By C. G. Siggers
Attorney

UNITED STATES PATENT OFFICE.

CHARLES HENRY MYERS, OF BUFFALO, NEW YORK.

THERMOMETER-DIAL.

955,091.          Specification of Letters Patent.       Patented Apr. 12, 1910.

Application filed July 8, 1909. Serial No. 506,632.

*To all whom it may concern:*

Be it known that I, CHARLES H. MYERS, a citizen of the United States, residing at Buffalo, in the county of Erie and State of New York, have invented a new and useful Thermometer-Dial, of which the following is a specification.

This invention relates to thermometers and more particularly to dials therefor.

The invention has for its principal object to provide a dial of such design that it is plainly visible from a reasonably distant point without requiring the thermometer to be of such large dimensions as ordinarily necessary, the dial being provided with a novel arrangement of division marks and an index line associated with the mercury or other tube and having the degree numbers applied to appropriate parts of the line.

With these objects in view and others, as will appear as the description proceeds, the invention comprises the various novel features of construction and arrangement of parts which will be more fully described hereinafter and set forth in the claims appended hereto.

In the accompanying drawing, which illustrates one embodiment thereof, the figure represents a front view of a thermometer equipped with the improved dial.

Similar reference characters are employed to designate corresponding parts in the drawing.

Referring to the drawing, 1 designates a dial plate which may be made of any suitable material and shaped like a disk or any other suitable form. Arranged diametrically of the dial plate is a mercury or other tube 2 with which is associated a scale 3. The scale is composed of two parts having alternately arranged groups of degree marks 4 and 5 arranged at opposite sides of the tube in staggered relation, so that the groups taken together form a zigzag scale by which the temperature can be determined, and a zigzag index line 6 extends the full length of the scale and consists of cross bars 7 extending from one side edge of the scale to the other and behind the mercury tube 2. Each cross bar forms a common decimal degree mark between two adjacent groups of unit degree marks 4 and 5. The zigzag index line 6 may be viewed as inclosing alternately-disposed pockets 8, in the closed ends of which are arranged the unit marks 4 and 5, while in the open ends of the pockets are semi-decimal degree marks 10. It will thus be seen that the decimal degree marks are most prominent since they are heavier and longer and extend entirely across the thermometer scale, and the semi-decimal degree marks are also prominent, as they are disposed in the open spaces at the open ends of the pockets formed by the zigzag index line. By means of the unit marks between two adjacent decimal marks and the associated semi-decimal mark, the height of the mercury column and hence the temperature can be readily ascertained.

Extending around the periphery of the dial and at opposite sides of the scale are the decimal degree numbers 11 extending from zero to ninety degrees, and from each number extends a lead line 12 which joins with the zigzag index line at the appropriate decimal mark of the scale. At the upper and lower ends of the scales are additional decimal degree numbers which are printed smaller than the others, since they are used only during extreme temperature conditions and hence do not require as much prominence as the others, so that the size of the dial can be reduced to a minimum.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. A thermometer comprising a spirit tube, and a dial disposed behind the same, said dial being formed with a zigzag index line having spaced cross bars extending from opposite sides of the tube to form decimal degree marks, lead lines extending from opposite ends of alternate cross bars, and decimal degree numbers associated with the said lead lines and located at opposite sides of the scale.

2. A thermometer comprising a spirit tube, and a dial on which the tube is mounted, said dial having a scale formed with a zigzag index line constituting a plurality of pockets alternately arranged with open ends at opposite sides of the tube, the portions of the line between adjacent pockets forming decimal degree marks, semi-decimal degree marks disposed in the open ends of the pockets, unit degree marks arranged in the closed ends of the pockets, and decimal degree numbers arranged alternately at opposite sides of the scale in numerical order, and lead lines extending from the numbers to their respective decimal marks of the scale.

3. A thermometer comprising a spirit tube, and a dial therefor, said dial having a scale consisting of unit degree marks arranged in staggered relation at opposite sides of the tube, an index line having transverse portions forming decimal degree marks common to each pair of adjacent groups of unit degree marks, semi-decimal degree marks opposite each group of unit degree marks, two groups of decimal degree numbers arranged respectively at opposite sides of the scale, lead lines from the numbers to the decimal marks of the scale, and additional groups of degree numbers at the extremities of the scale and of smaller size than the first-mentioned degree numbers.

In testimony, that I claim the foregoing as my own, I have hereto affixed my signature in the presence of two witnesses.

CHARLES HENRY MYERS.

Witnesses:
MICHAEL MEYER,
ALBERT HOENER.